United States Patent
Ter Weeme

(10) Patent No.: US 12,538,398 B2
(45) Date of Patent: Jan. 27, 2026

(54) CONTROL OF A LIGHTING SYSTEM FOR COLOR POINT AND FLUX LEVEL CONTROL

(71) Applicant: SIGNIFY HOLDING B.V., Eindhoven (NL)

(72) Inventor: Berend Jan Willem Ter Weeme, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 88 days.

(21) Appl. No.: 18/577,249

(22) PCT Filed: Jul. 11, 2022

(86) PCT No.: PCT/EP2022/069339
§ 371 (c)(1),
(2) Date: Jan. 6, 2024

(87) PCT Pub. No.: WO2023/285393
PCT Pub. Date: Jan. 19, 2023

(65) Prior Publication Data
US 2024/0284569 A1    Aug. 22, 2024

(30) Foreign Application Priority Data
Jul. 16, 2021   (EP) .................................... 21186192

(51) Int. Cl.
*H05B 45/28*    (2020.01)
*H05B 47/175*   (2020.01)

(52) U.S. Cl.
CPC .......... *H05B 45/28* (2020.01); *H05B 47/175* (2020.01)

(58) Field of Classification Search
CPC .... H05B 45/28; H05B 47/105; H05B 47/175; H05B 47/16; H05B 45/24
See application file for complete search history.

(56) References Cited

U.S. PATENT DOCUMENTS

| | | |
|---|---|---|
| 9,013,467 B2 | 4/2015 | Sisto |
| 9,167,656 B2 | 10/2015 | Raj et al. |
| 10,321,541 B2 | 6/2019 | Bora et al. |
| 2006/0082331 A1 | 4/2006 | Ashdown |
| 2010/0259182 A1 | 10/2010 | Man et al. |

(Continued)

FOREIGN PATENT DOCUMENTS

| | | |
|---|---|---|
| CA | 2791258 A1 | 9/2011 |
| JP | 2009526385 A | 7/2009 |

(Continued)

OTHER PUBLICATIONS

Translation of WO-2020111037-A1 (Year: 2020).*

(Continued)

*Primary Examiner* — Renan Luque

(57) ABSTRACT

A method is provided for controlling a multi-channel lighting system in which (nominal) color point information in respect of the light sources is adjusted both in dependence on a temperature estimate and on the current drive levels needed. The method thus compensates separately for the light source temperature and the effect that the calculated current drive levels have on the color point and flux. An iterative loop finds the current drive levels to achieve a desired color point and flux.

15 Claims, 8 Drawing Sheets

(56) References Cited

U.S. PATENT DOCUMENTS

| | | | |
|---|---|---|---|
| 2010/0301777 A1 | 12/2010 | Kraemer | |
| 2016/0044760 A1* | 2/2016 | Robert | H05B 47/105 |
| | | | 315/307 |
| 2017/0162130 A1* | 6/2017 | Ghoshal | G09G 3/342 |
| 2018/0324926 A1* | 11/2018 | Fleissner | H10K 59/90 |
| 2020/0128640 A1 | 4/2020 | Van Voorst Vader | |
| 2021/0301777 A1 | 9/2021 | Parsa et al. | |

FOREIGN PATENT DOCUMENTS

| | | | | |
|---|---|---|---|---|
| JP | 2010538434 | A | 12/2010 | |
| JP | 2013521593 | A | 6/2013 | |
| WO | 2004025998 | A2 | 3/2004 | |
| WO | 2006011108 | A1 | 2/2006 | |
| WO | 2008006205 | A1 | 1/2008 | |
| WO | 2011036612 | A1 | 3/2011 | |
| WO | 2011106661 | A1 | 9/2011 | |
| WO | 2013157773 | A1 | 10/2013 | |
| WO | 2014067830 | A1 | 5/2014 | |
| WO | WO-2020111037 | A1 * | 6/2020 | ......... G02B 27/0101 |

OTHER PUBLICATIONS

Dyble et al., "Impact of Dimming White LEDs: Chromaticity Shifts Due to Different Dimming Methods" Fifth International Conference on Solid State Lighting, Proceedings of SPIE, vol. 5941, 10 pages, 2005.

Lee et al., "Precise Dimming and Color Control of Light-Emitting Diode Systems based on Color Mixing" IEEE Transactions on Power Electronics, 34 pages, 2015.

Srividya et al., "An Embedded System for Color Point Control of LEDs Against Ambient Temperature Variations" Advances in Intelligent Systems and Computing, 11 p. 2018.

* cited by examiner

CONTROL OF A LIGHTING SYSTEM FOR COLOR POINT AND FLUX LEVEL CONTROL

CROSS-REFERENCE TO PRIOR APPLICATIONS

This application is the U.S. National Phase application under 35 U.S.C. § 371 of International Application No. PCT/EP2022/069339, filed on Jul. 11, 2022, which claims the benefit of European Patent Application No. 21186192.7, filed on Jul. 16, 2021. These applications are hereby incorporated by reference herein.

FIELD OF THE INVENTION

The invention relates to the control of lighting systems, in particular to enable flux level control (i.e. dimming) while maintaining a desired color point.

BACKGROUND OF THE INVENTION

Multi-channel lamps enable color point control by having different channels with different color points, and independently controlling the drive levels applied to the different channels.

It is for example well known to use pulse width modulation, PWM, dimming in multi-channel lamps, in particular for LED lamps. PWM dimming is very attractive since the LED behavior can be well predicted. In particular, the same current is always driven through the LED lamp, and changing the dimming level only involves selecting a time duration that the lamp is on. By selecting a sufficiently high frequency of the PWM control signal, the on-off cycling is not visible to the human eye.

However, there is increasing attention for flickering, which is an inherent disadvantage of PWM dimming for low PWM frequencies (which are less expensive to implement). Furthermore, there is an increasing focus in the integrated circuit, IC, industry on ICs with amplitude modulation dimming capabilities.

PWM dimming systems use a fixed current, so current correction (i.e. correcting for color point variations as a function of current) is not needed as mentioned above. It is however common practice to correct the color points (e.g. XYZ values of the CIE 1936 color space) of each channel for temperature, especially when a direct red LED is used.

To be able to use mainstream amplitude dimming ICs and achieve desired control of the output color point of the multi-channel lighting system, current effects become a problem in achieving accurate color point control.

CA2791258A1 discloses a method of operating a lighting fixture comprising a plurality of discrete illumination sources of distinguishably different color coordinates comprises determining target color coordinates and luminous flux at which to operate the lighting fixture, determining input electrical power values for each of the plurality of discrete illumination sources that substantially produce the target color coordinates and luminous flux by referencing a calibration data lookup table having calibration data based on measurements of the plurality of discrete illumination sources, determining a color mixing zone defined by three distinguishably different color coordinates of the plurality of discrete illumination sources within which the target color coordinates lie according to the calibration data, determining luminous flux ratios for each of the plurality of discrete illumination sources having one of the three distinguishably different color coordinates defining the color mixing zone that substantially produces the target color coordinates.

US2010/301777A1 discloses a method for the temperature-dependent adjustment of the color properties or the photometric properties of an LED illuminating device having LEDs emitting light of different colors or wavelengths or LED color groups emitting light of the same color or wavelength within a color group, the luminous flux portions thereof determine the color of light, color temperature and/or the chromaticity coordinates of the light mixture emitted by the LED illuminating device.

US2010/259182A1 discloses a light source comprising one or more first light-emitting elements for generating light having a first wavelength range and one or more second light-emitting elements for generating light having a second wavelength range. The first light-emitting elements and second light-emitting elements are responsive to separate control signals provided thereto. A control system receives a signal representative of the operating temperature from one or more sensing devices and determines first and second control signals based on the desired color of light and the operating temperature. The light emitted by the first and second light-emitting elements as a result of the received first and second control signals can be blended to substantially obtain the desired color of light. The desired color of light generated can thus be substantially independent of junction temperature induced changes in the operating characteristics of the light-emitting elements.

SUMMARY OF THE INVENTION

The invention is defined by the claims.

According to examples in accordance with an aspect of the invention, there is provided a method of controlling a lighting system which comprises a plurality of lighting channels with light sources having different color points, comprising:
  a first step of receiving color point information comprising nominal color point information in respect of the light sources;
  a second step of adjusting the color point information in dependence on a currently up to date temperature estimate;
  a third step of further adjusting the color point information in dependence on a currently up to date current drive level for the respective lighting channel, wherein the second and third steps may be performed in either order;
  a fourth step of using the further adjusted color point information to determine a flux contribution of each lighting channel to achieve a desired combined color point and combined light output flux from the plurality of lighting channels;
  a fifth step of updating the current drive levels for the plurality of lighting channels to create updated current drive levels to achieve the flux contribution of each lighting channel;
  a sixth step of updating the temperature estimate to create an updated temperature estimate based on the updated current drive levels; and
  repeating the second to sixth steps if required.

This method determines current drive levels for a set of channels in order to achieve a desired color point and a desired brightness (e.g. dimming level), but ensuring that the effect that operating the channels at different currents has on the resulting color point is taken into account. It enables color point control as well as brightness level (i.e. dimming level) control, so that the color point remains constant for all brightness (i.e. dimming) levels. This provides an analog current level control approach, which may be used alone or in combination with a digital (PWM) current level control.

A first compensation measure is that a temperature (e.g. LED junction temperature) resulting from different drive currents is determined, and this is used to model how the color point will vary. This temperature compensation is known.

The method of the invention additionally takes into account the way different color points of the lighting channels require a different drive current. Blue and green LEDs in particular show a considerable color shift. Thus, the color point information is additionally updated in dependence on the current drive level for the respective lighting channel. This may be implemented in various ways, for example depending on the types of light source.

Due to the color shift, the balance of the different channels needs to change in order to achieve the desired set point of the complete light source. Another effect is that the drive current and flux are non-linearly related, especially when there is a large range of possible drive currents. Part of the non-linearity is due to intrinsic effects in the LED die. All of these effects are manifested as a flux change in relation to the current so that a different current drive level is needed to achieve a given flux.

The color shift is independent of temperature so that they are modelled as independent effects (which can be corrected in either order), and a temperature control loop alone cannot provide full compensation.

The method of the invention thereby enables non-linear flux versus current to be taken into account as well as the change in color point with current, separately and in addition to temperature compensation. The method is iterative and repeats steps until sufficient color point control accuracy is reached.

The second to sixth steps are repeated until:
the temperature estimate converges to a value which deviates, when being updated, by less than a threshold; and/or
the current drive levels converge to values which deviate, when being updated, by less than a threshold.

In an embodiment, the second to sixth step are repeated until the temperature estimate converges to a value which deviates, when being updated, by less than a threshold, and the current drive levels converge to values which deviate, when being updated, by less than a threshold.

Thus, the method may iteratively arrive at a correct set of color points (and output flux) by suitable adaptation of the current drive levels, based on an accurate temperature estimate and with compensation for the effects that the current drive levels have on the color point.

The second step may comprise transforming CIE 1936 XYZ color coordinates to CIE xy chromaticity color coordinates, applying temperature corrections on dx/dt and dy/dt, and transforming back to XYZ color coordinates.

This provides an effective way to implement temperature compensation.

In one approach, the third step may comprise using information relating to the rate of change of CIE xy chromaticity color coordinates with respect to drive current.

This approach for modeling the dependence of color on drive current is particularly suitable for phosphor-converted LEDs.

In another approach, the third step may comprise:
a first sub-step of deriving a representative wavelength for the adjusted color point information;
a second sub-step of adjusting the representative wavelength in dependence on a currently up to date current drive level for the respective lighting channel; and
a third sub-step of further adjusting the color point information based on the adjusted representative wavelength.

This approach for modeling the dependence of color on drive current is particularly suitable for direct LEDs. In this way, the method takes into account the way a dominant wavelength requires a different drive current.

The first sub-step for example uses a model for converting from a color point to a representative wavelength. The representative wavelength is a dominant wavelength for that color point. The dominant wavelength is for example defined by (in the CIE color coordinate space) drawing a line through a white point and the x,y coordinates. The wavelength where the line intersects with the perimeter of the color space is the dominant wavelength.

The second sub-step for example uses a model of the current dependency of different wavelengths and determines a color point shift with wavelength based on a model of the CIE x,y color coordinates as a function of a dominant wavelength.

The third sub-step for example uses a model for converting from a representative wavelength to a color point.

Thus, the second and third steps translate between current and wavelength so that a relationship between wavelength and current can be used.

The method may further comprise applying pulse width modulation to the drive currents for the lighting channels. Thus, an analog drive current scheme may be combined with a PWM drive scheme. The PWM setting (for one or more of the channels) may for example be set to be 1. Thus, difference in channels is implemented by PWM control with the longest possible duty cycles, and further scaling use amplitude modulation control.

The invention also provides a method of controlling a lighting system which comprises a plurality of lighting channels with light sources having different color points, comprising:
for a first range of dimming levels, applying the analog method defined above; and
for a second range of dimming levels, applying pulse width modulation dimming.

The method above, which is an analog dimming method, may thus be combined with PWM dimming, based on the dimming level applied.

The first range may be for low brightness levels and the second range is for high brightness levels.

In this first approach, the PWM dimming may initially be used (for high brightness) and the method above may be used for low brightness levels. This increases the resolution at low brightness.

The first range may instead be for high brightness levels and the second range is for low brightness levels.

In this second approach, the analog dimming may initially be used (for high brightness) to avoid flicker and PWM dimming may be used for low brightness levels. This reduces the required dimming range for the analog dimming and improves the accuracy of the analog dimming model.

The invention also provides a computer program comprising computer program code which is adapted, when said program is run on a computer, to implement the method defined above.

The invention also provides a processor for controlling a lighting system which comprises a plurality of lighting channels with light sources having different color points, wherein the processor is programmed using the computer program defined above.

A lighting controller may incorporate the processor.

The invention also provides a multi-channel lighting system comprising:
- a plurality of lighting channels, the different lighting channels having light sources with different color point; and
- a lighting system controller as defined above for controlling the drive currents to the different lighting channels.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
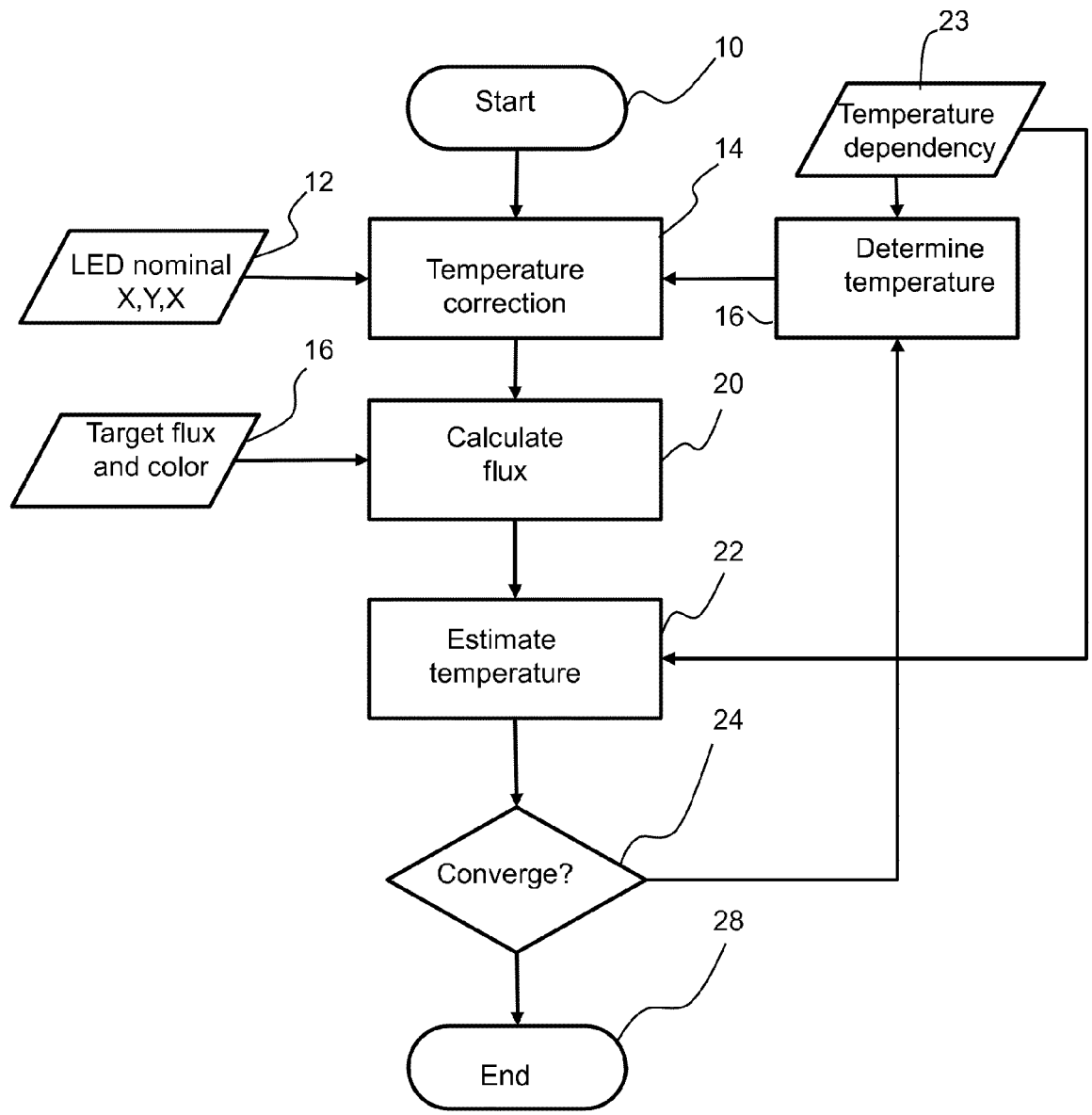
FIG. 1 shows a known method for determining flux levels for separate channels to take account of temperature.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method of controlling a multi-channel lighting system in which (nominal) color point information in respect of the light sources is adjusted both in dependence on a temperature estimate and on the current drive levels needed. The method thus compensates separately for the light source temperature and the effect that the calculated current drive levels have on the color point and flux. An iterative loop finds the current drive levels to achieve a desired color point and flux.

FIG. 1 shows a known method for determining flux levels for separate channels to take account of temperature. Drive currents are derived from the flux levels.

The method starts at step 10. An input to the flow diagram includes the nominal color points 12 of the individual LEDs under reference conditions. These are for example provided as CIE 1931 XYZ coordinates for easy calculation. However, the color point information may be processed in another color space.

A temperature correction to the XYZ coordinates is made in step 14 based on a temperature estimate, which starts as an initial temperature estimate in step 16 and in subsequent iterations is generated by the method, as will be clear from the explanation below.

Given a target color and flux, provided as input 18, the relative flux contribution of each of the channels can be calculated in step 20.

Based on the calculated flux requirements, the LED temperatures can be estimated in step 22. This takes account of on a temperature dependency model 23. Convergence of the temperature estimation is checked in step 24. If there is not yet convergence between the estimated temperature and the previous temperature estimation, the method returns to the XYZ correction step 14.

The process ends in step 28 when there is convergence.

The invention extends the temperature compensation to enable amplitude modulation of the current, and in particular so that the effect of a non-constant drive current on the color point can be compensated.

The impact of amplitude modulation dimming has been analyzed for typical red, green and blue LEDs. Especially the blue and the green LEDs show a considerable color shift with dimming.

Figure 2:
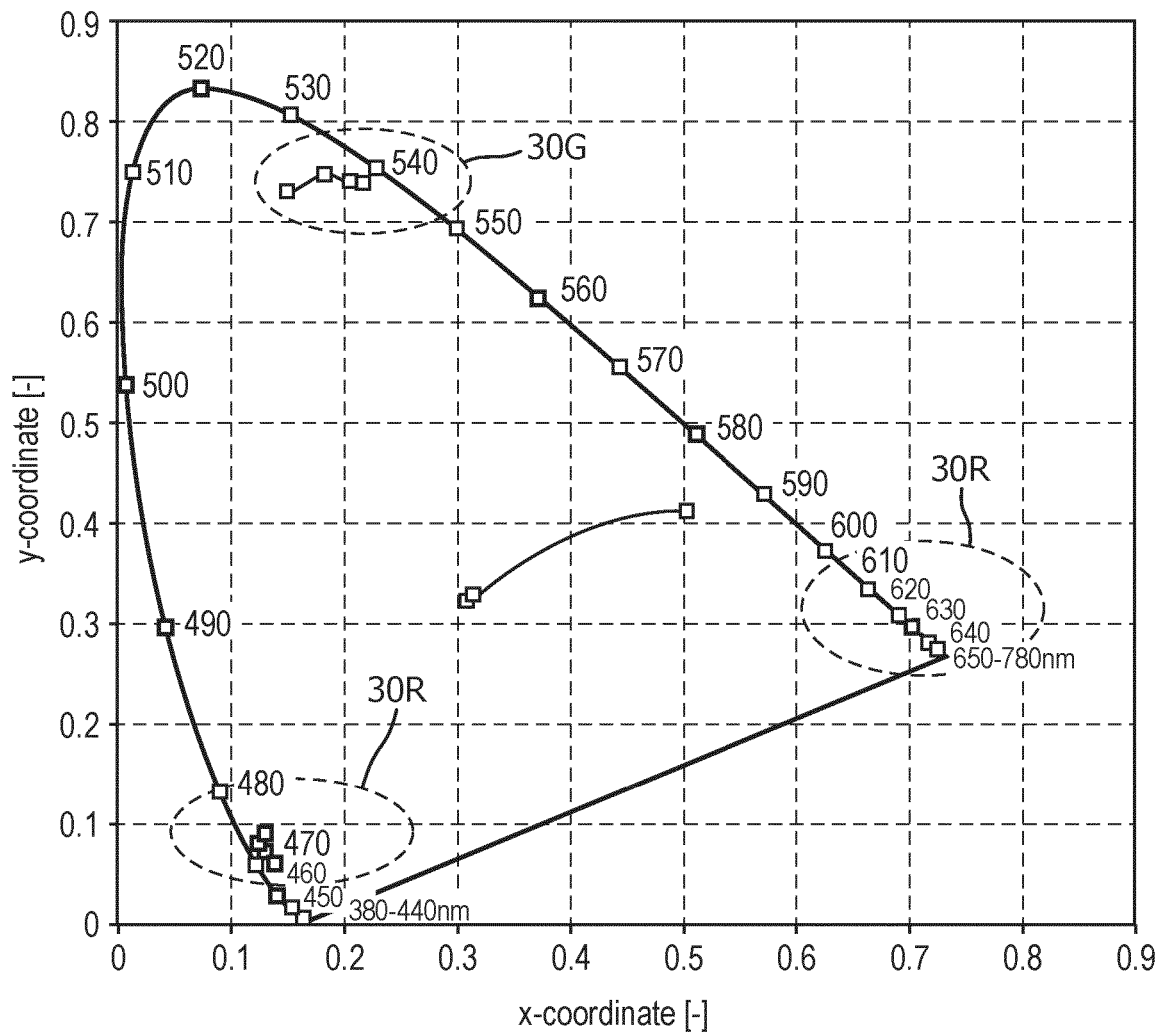
FIG. 2 shows a CIE chromaticity diagram and shows the effect of amplitude modulation dimming on phosphor-converted LEDs.

FIG. 2 shows a CIE chromaticity diagram. The regions 30R, 30G, 30B show how the color points of the red, green and blue LEDs shift due to amplitude modulation dimming from 100% to a 0.1% dimming level for phosphor-converted LEDs. The different points are for different dimming levels. It can be seen that the color point shift is most pronounced for the blue and green LEDs.

In addition to the color point shift, LEDs also show a non-linear behavior between output flux and current, especially given the large range of currents.

Figure 3:
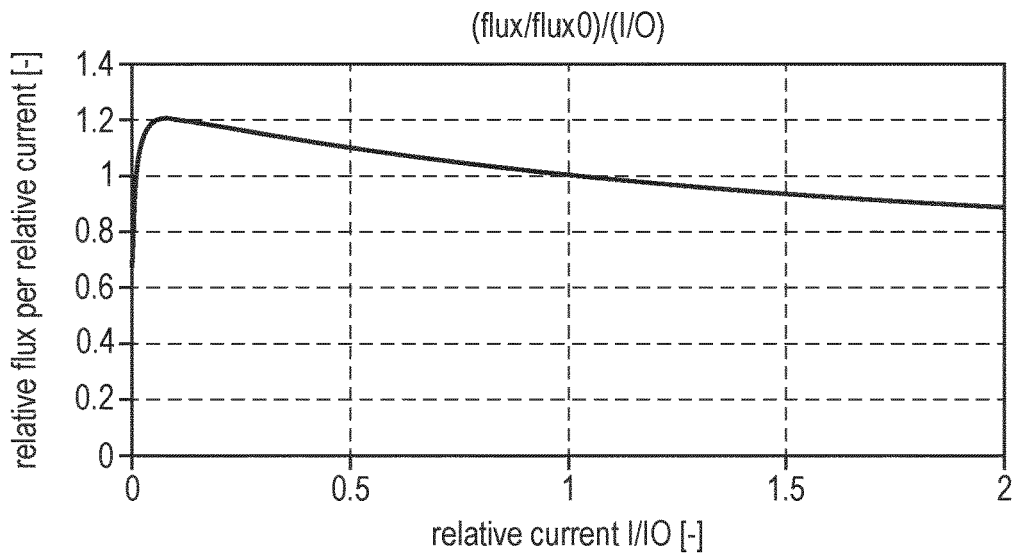
FIG. 3 shows a typical relationship between relative flux per relative current (y-axis) versus relative current (x-axis)

FIG. 3 shows a typical relative flux per relative current (y-axis) versus the relative current (x-axis). The graph shows the change of slope of the relative flux versus relative current curve. The relationship is non-linear as shown.

Applying the known algorithm for color point control, using temperature compensation but neglecting the shifts of flux and color point with current, will result in considerable color shifts of the LED device.

Figure 4:
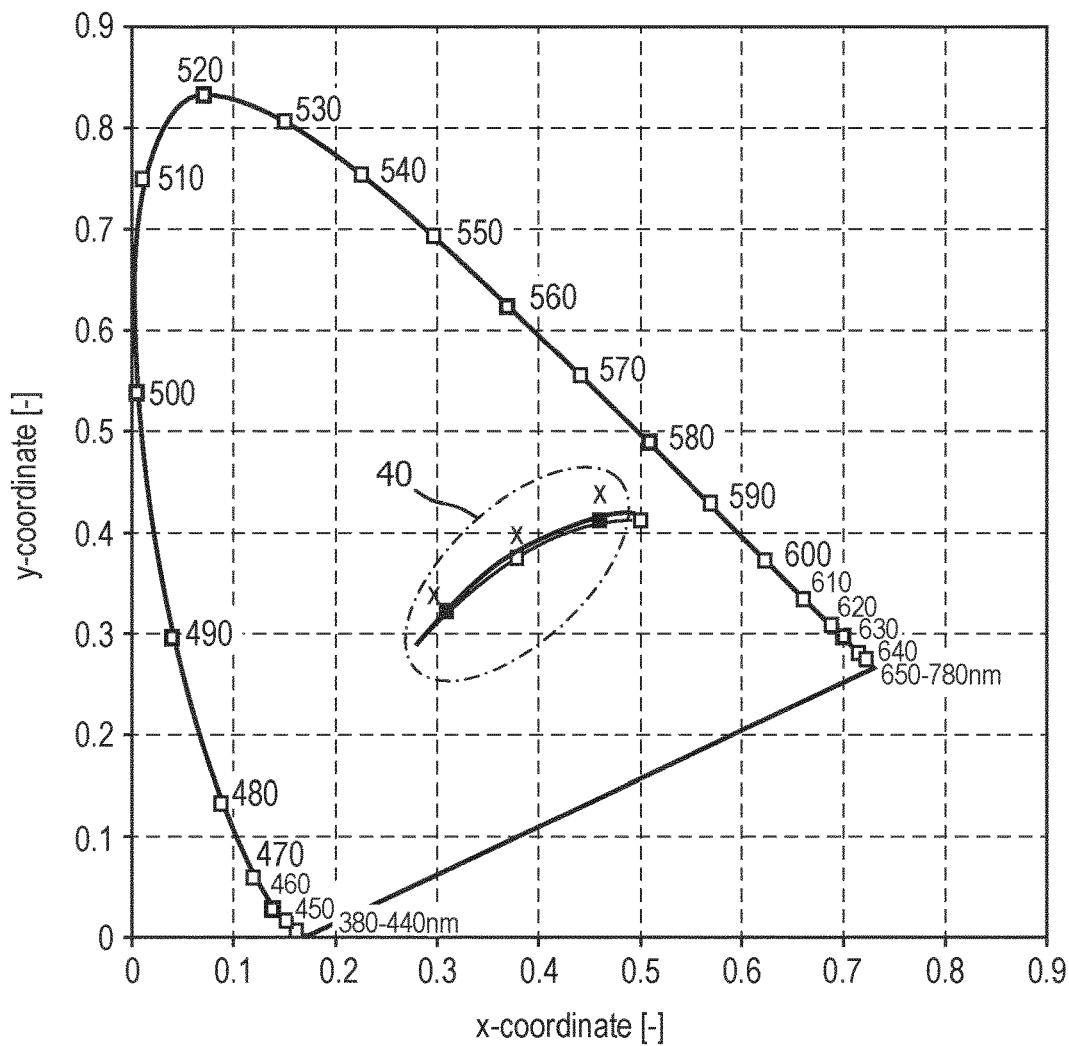
FIG. 4 shows a color point shift of the lighting system at a 2% dimming level.

FIG. 4 shows the color point shift of the lighting system at a 2% dimming level. The crosses in region 40 show the color point shifts for 2700K, 4000K and 6500K target color points. The target color points are on the solid line. The shifts are approximately twice as large as the allowed color point deviations in the ANSI regulations.

It can be concluded that the combination of amplitude modulation dimming without proper compensation for non-linearity in flux versus current and the color point shift will not lead to acceptable color consistency.

This invention provides a suitable method for correcting the non-linear behavior of the flux and color point with current. The invention provides additional features to be added to the known corrections for temperature. Thus, the aim is to describe the change of color point, for example as XYZ coordinates, as a function of temperature as well as current.

Figure 5:
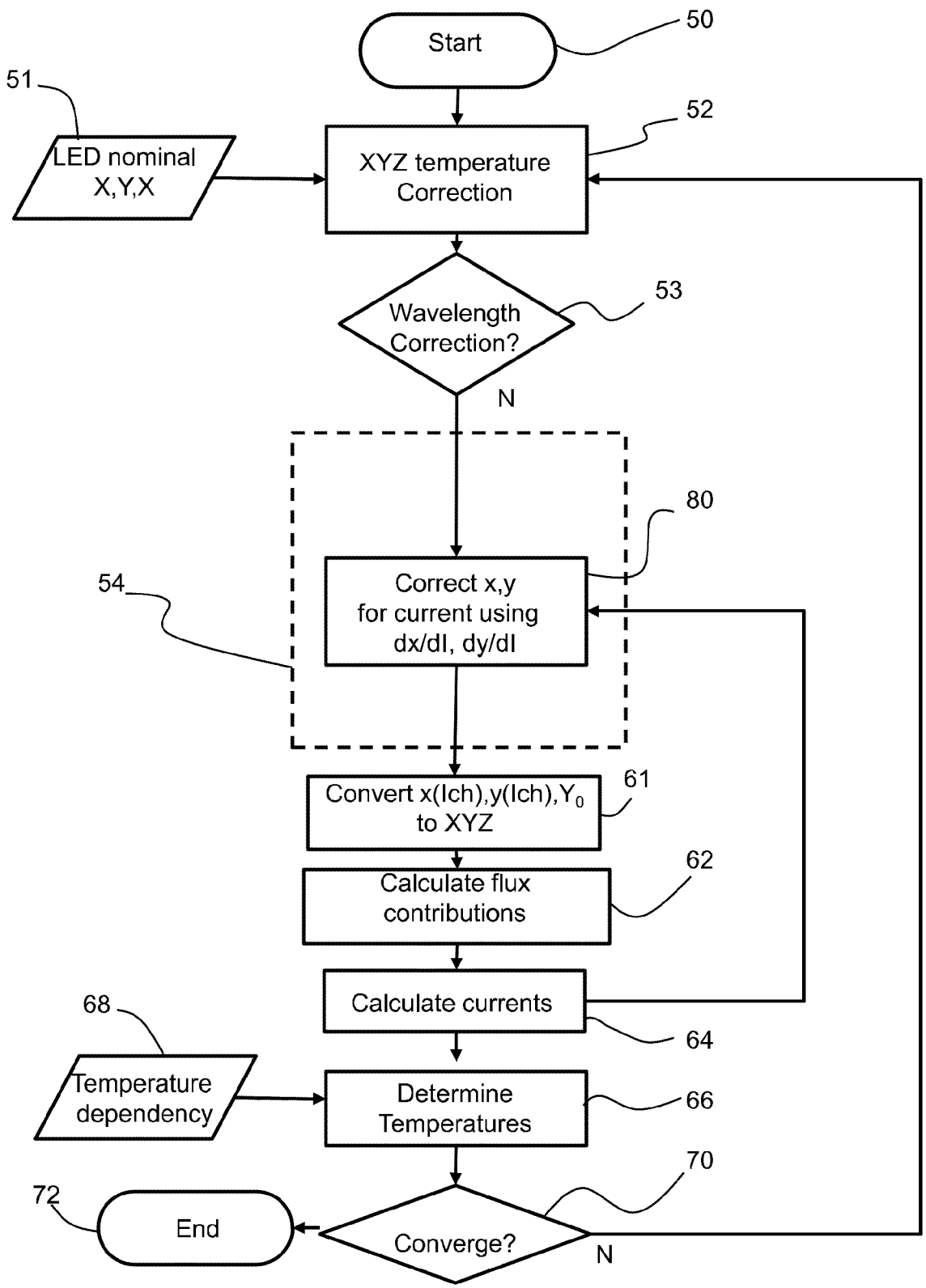
FIG. 5 shows first option within a method of controlling a lighting system.
Figure 6:
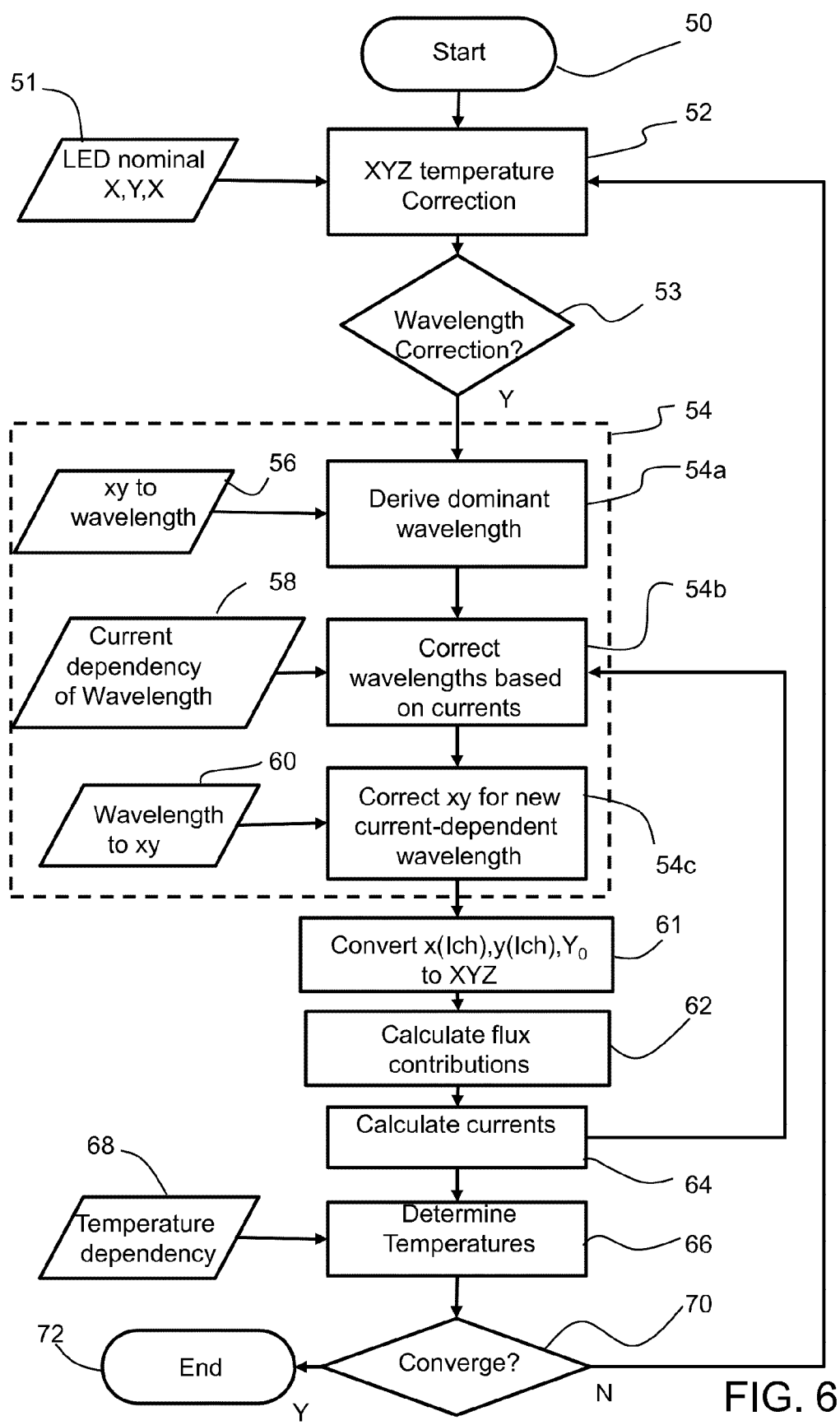
FIG. 6 shows second option within the method of FIG. 5.

FIGS. 5 and 6 show a method of controlling a lighting system which comprises a plurality of lighting channels with light sources having different color points.

The method starts in step 50 and then comprises a first step of receiving nominal color point information 51 in respect of the light sources. In a second step 52, the color point information is adjusted in dependence on a temperature estimate. This temperature estimate is derived later in the method and is fed back, thereby forming an iterative loop. Thus, the temperature estimate is updated during each iteration, and the temperature correction is based on the most up to date, i.e. most recent, temperature estimate (or an initial estimate at the beginning of the method).

The temperature correction for example involves transforming CIE 1936 XYZ color coordinates to CIE xyY chromaticity color coordinates, and applying temperature corrections on dx/dT and dy/dT and the flux level. This provides an effective (known) way to implement temperature compensation. The formulas for the transformation are generally known and given by:

$$X = x/y$$
$$Y = Y$$
$$Z = (1 - x - y)/y$$

In this example, the output of step 52 is xyY values.

The flow chart of FIGS. 5 and 6 includes two possible correction approaches, one based on the dependency of x and y chromaticity values with current and the other based on the dependency of wavelength on current.

Step 53 determines whether the correction is based on wavelength or current. FIG. 5 then shows the only steps of the correction method based on current. FIG. 6 shows the alternative paths through the method. The first steps (50,52, 53) and last steps (61,62,64,66,70) are common to both paths through the method.

Note that the invention may provide a system which has only one of these two approaches, or it may provide a system which enables a choice to be made as shown in FIGS. 5 and 6.

A third step 54 (which is used in both approaches but with different steps) involves further adjusting the color point information in dependence on a current drive level for the respective lighting channel. This current drive level is also derived later in the flow chart and is fed back, again thereby forming an iterative loop. Thus, the current settings are updated during each iteration, and the color point adaptation, to take account of current levels, is based on the most up to date, i.e. most recent, current settings.

A first order approximation for correcting the color point is to apply a linear relation between the color point and the current, so using factors dx/dI and dy/dI.

If the data is in XYZ form, the can be conversion to xyY form. The third step 54 in FIG. 5 then comprises using information relating to the rate of change of CIE xy chromaticity color coordinates with respect to drive current in step 80. This approach for modeling the dependence of color on drive current is particularly suitable for phosphor-converted LEDs.

Step 61 converts back to XYZ coordinates.

A fourth step 62 involves using the further adjusted color point information to determine a flux contribution of each lighting channel to achieve a desired combined color point and combined light output flux from the plurality of lighting channels.

In this fourth step 62, the non-linear flux relation (as shown in FIG. 3) can be compensated. Flux variation with current and temperature are modelled directly as Y=Y(I,T).

The fourth step 62 provides an output in the form of a set of relative flux fractions f1 . . . fn for an n channel system. The relative flux fractions indicate how much flux each channel should make in order to meet the target flux. The values f are between 0 and 1. If a target color point value X,Y,Z and the X,Y,Z values of the LEDs (after temperature and current compensation) result in a value of f larger than 1, the target is not achievable and needs to be scaled.

Form this set of desired flux levels for each channel, a fifth step 64 involves updating the current drive levels for the plurality of lighting channels to create updated current drive levels. These are the current levels required to achieve the determined flux contribution of each lighting channel. These current levels are fed back to step 80.

Given the non-linear nature of the color point shift with current in direct LEDs, the shift may be instead modelled as a rate of change of wavelength as a shift in dλ/dI.

From these updated current levels, a sixth step 66 involves updating the temperature estimate to create an updated temperature estimate. This uses a temperature dependency model 68.

A convergence test is performed in step 70 to determine if the iterative process can be stopped. If there is convergence, the method ends in step 72, and if there is not, the method returns to the second step 52.

FIG. 6 shows the steps of the method if the wavelength-based approach is selected.

The third step 54 then comprises a first sub-step 54*a* of deriving a representative wavelength for the adjusted color point information. This makes use of a conversion function 56 which maps from xy values to dominant wavelength. Again, a conversion step may be used from XYZ to xy Y if needed.

The representative wavelength is a dominant wavelength. The dominant wavelength is for example defined in the CIE color coordinates by drawing a line through a white point and the x,y coordinates. The wavelength where the line intersects with the perimeter of the color space is the dominant wavelength A color shift as a result of the current is found to move more or less parallel with the perimeter in the CIE space so a dominant wavelength is a robust way of representing this color shift.

A second sub-step 54*b* involves adjusting the representative wavelength in dependence on a the most recent current drive level for the respective lighting channel. This makes use of a model 58 of the dependency of the dominant wavelength on current, i.e. using the value dλ/dI.

A third sub-step 54*c* involves further adjusting the color point information based on the adjusted representative wavelength. This makes use of a conversion function 60 which maps back the dominant wavelength to xy values. This conversion function for example describes the chromaticity color coordinates x and y as a function of the dominant wavelength.

This approach for modeling the dependence of color on drive current is particularly suitable for direct LEDs. In this way, the method takes into account the way a dominant wavelength requires a different drive current.

The same step 61 converts back to XYZ coordinates.

The same fourth step 62 is used, and again involves using the further adjusted color point information to determine a flux contribution of each lighting channel to achieve a desired combined color point and combined light output flux from the plurality of lighting channels.

Form this set of desired flux levels for each channel, the same fifth step 64 involves updating the current drive levels for the plurality of lighting channels to create updated current drive levels. These are the current levels required to achieve the determined flux contribution of each lighting channel. These current levels are fed back to step 54b.

The same sixth step 66 involves updating the temperature estimate to create an updated temperature estimate using the temperature dependency model 68.

The same convergence test is performed in step 70 to determine if the iterative process can be stopped. If there is convergence, the method ends in step 72, and if there is not, the method returns to the second step.

Note that a light source may comprise both direct and phosphor-converted LEDs. Thus the two different correction models may be combined within a system. However, either correction model may be used for either or both types of LED. However, for direct LEDs especially, the wavelength correction approach will give better results.

Of course, there are other transformations that may be used to give a simple relationship between temperature and current on the one hand and the CIE 1936 XYZ coordinates on the other hand. Another method could for example be to use CIE 1976 coordinates and describe the shifts first as du'/dT and dv'/dT and/or as du'/dI, and dv'/dI.

The most appropriate model may be found by fitting the measurement data against different coordinate systems and chosing the most appropriate. Further improvements can be made by using non-linear polynomial fits, power fits, exponential fits or logarithmic fits.

This method thereby determines current drive levels for a set of channels in order to achieve a desired color point and a desired brightness (e.g. dimming level), but ensuring that the effect of operating the channels at different currents on the resulting color point is taken into account. It enables color point control as well as brightness level (i.e. dimming level) control, so that the color point remains constant for all brightness (i.e. dimming) levels. The method takes into account the way different color points of the lighting channels requires a different drive current.

The method enables the balance of the different channels to be changed in order to achieve a desired set point of the complete light source. The color shift as a function of drive current is treated independently of temperature so that they are modelled as independent effects. The method enables the non-linear flux versus current relationship explained above to be taken into account as well as the change in color point with current, separately and in addition to temperature compensation.

The convergence test for example involves determining if the temperature estimate has converged such that a next update gives a change below a threshold. Similarly, the convergence may (instead or as well) test is the current drive levels have converged such that a next update gives a change below a threshold.

Thus, the method may iteratively arrive at a correct set of color points (and output flux) by suitable adaptation of the current drive levels, based on an accurate temperature estimate and with compensation for the effects that the current drive levels have on the color point.

The method described above is based on an analog amplitude modulation approach. However, this may be combined with a digital pulse width modulation approach in various ways, as described below.

The use of amplitude modulation in addition to a PWM dimmed system may be used to improve the resolution. Many standard PWM systems just use an 8-bit dimming control. However, at deep dimming, an 8-bit resolution is not sufficient. By changing the overall current using amplitude modulation, a gain in resolution can be achieved. For example, amplitude dimming from 100% to 12.5% adds an accuracy gain comparable to 3 additional bits in a full PWM system.

One option is to use amplitude modulation dimming below a certain total system dimming level, so that the initial dimming is performed using PWM dimming. This approach will however show inherent flicker of a PWM dimmed system when there is high brightness.

An alternative option is to start the system dimming using amplitude modulation. This initial amplitude modulation may for example be down to a 20% dimming level to avoid a large current range and a wide range for consistent LED behavior fitting. Below the 20% level, additional dimming is then implemented using PWM control.

Thus there are three possible configurations which combine amplitude modulation and PWM dimming.
 (i) First dim the system with PWM dimming. Add amplitude modulation dimming to increase resolution at low dimming (i.e. low brightness) levels.
 (ii) First dim the system with amplitude modulation dimming to avoid flickering. Add PWM dimming to avoid a too large AM dimming range and reduce the risk of model fit inaccuracies.
 (iii) Combine amplitude modulation and PWM dimming for all dimming levels. This may for example involve always dimming in such a way that the largest PWM duty ratio always reaches 1. In this way, the PWM control sets the differences between channels, but with the maximum duty cycle. Amplitude dimming then provides a scaling. This could be especially attractive in shunt switched multi-channel systems.

Figure 7:
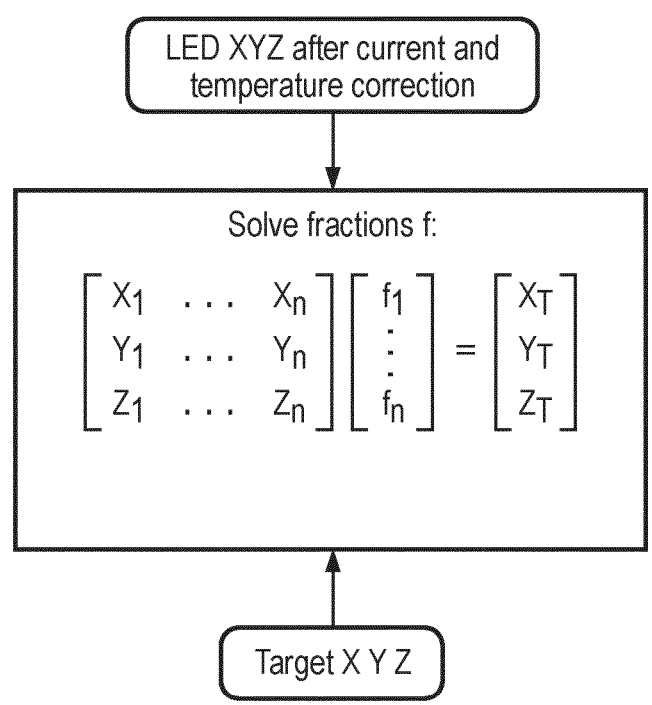
FIG. 7 shows how channel fractions are determined.

FIG. 7 shows how the relative flux contribution of each channel is obtained with respect to the Y0 value of the LED channel, i.e. the fraction value f_ch for the channel.

The method involves solving the vector equations shown which map between the temperature and current corrected LED values and the target XYZ values ($X_T$, $Y_T$, $Z_T$).

This yields fractions f1 to fn for the channels. The output is thus the relative flux fractions f1 . . . fn for an n channel system. The relative flux fractions indicate how much flux each channel should make in order to meet the target flux. The system needs to ensure the value of f is between 0 and 1. If f is larger than 1, the right-hand side target should be scaled.

Figure 8:
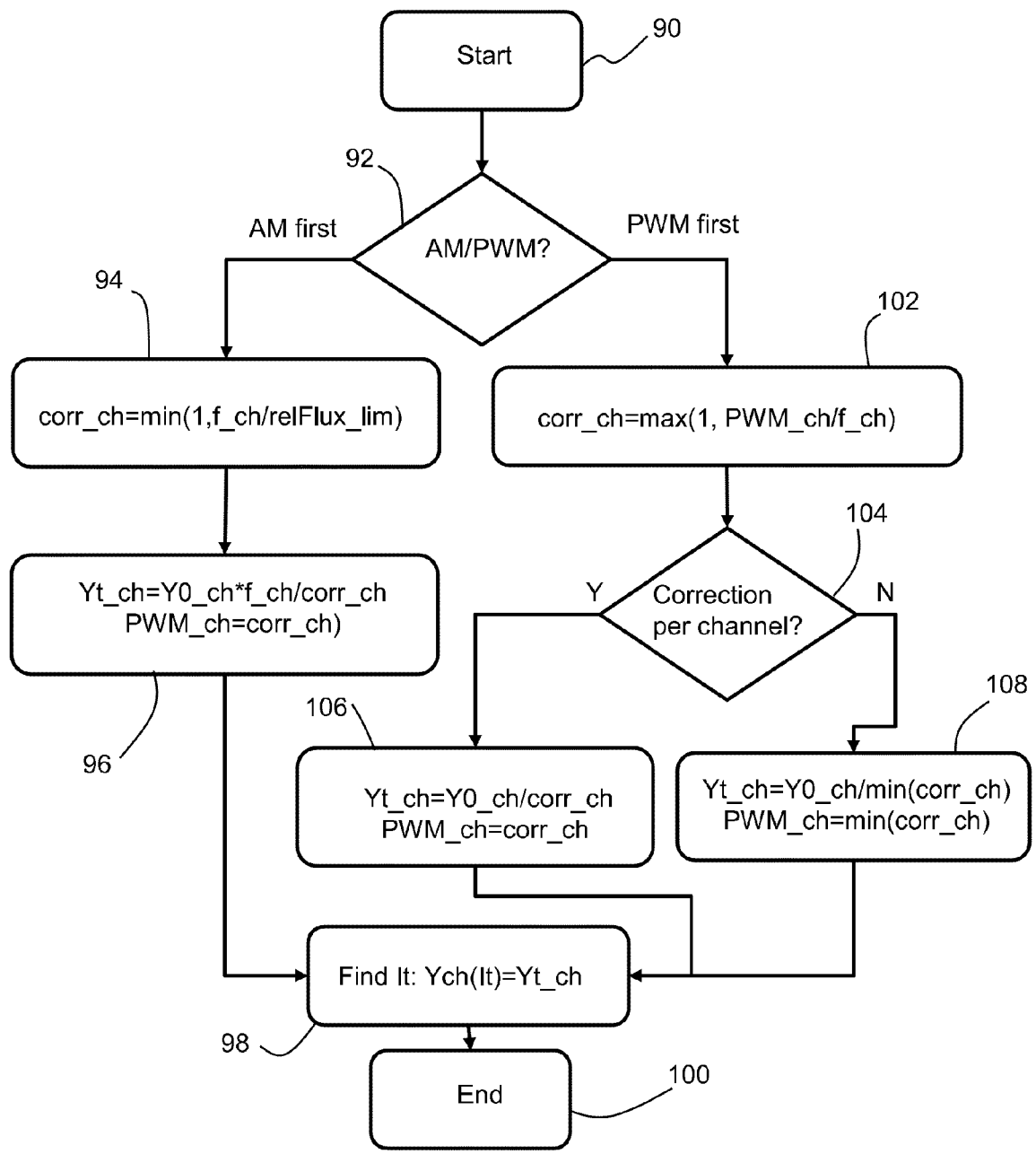
FIG. 8 shows a method by which amplitude modulation and PWM may be combined.
Figure 9:
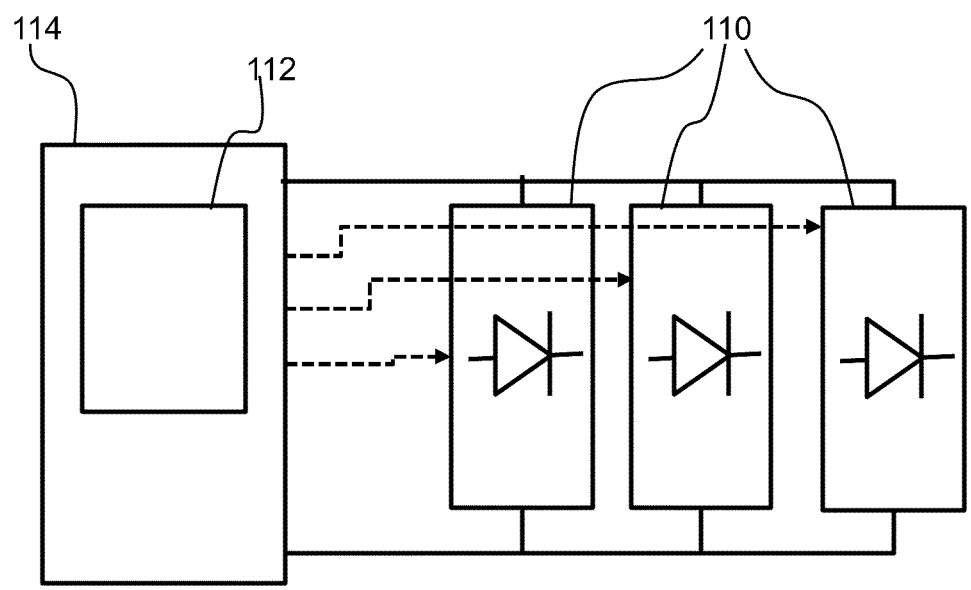
FIG. 9 shows a multi-channel lighting system.

FIG. 8 shows a method which enables PWM dimming down to a threshold brightness then uses amplitude modulation or enables amplitude modulation down to a threshold then uses PWM dimming.

The method is used after the desired flux levels are known, from the method described above (step 62).

Some values will be defined to enable FIG. 8 to be understood.

The color point and flux of a channel after the temperature correction is defined as x0,y0,Y0.

Thus, Y0_ch is a temperature corrected flux of the particular channel as indicated in the flow diagram at the end of the step 54.

x(It_ch) and y(It_ch) give the color point correction for the target current (It) for each channel (ch) after amplitude modulation dimming.

Yt_ch is the target flux (Yt) of a channel (ch) at a PWM setting of 1 (i.e. when permanently on).

It_ch is the target current (It) of a channel (ch) after amplitude modulation dimming.

When the iteration is completed, Ych(It_ch)=Yt_ch. In other words, the flux of the channel at the target current is equal to the target flux.

Ych is the function that describes the non-linear relation between flux and current.

If amplitude modulation dimming is to be used first, a target value relFlux_lim is defined. relFlux_lim gives the flux relative to Y0 below which PWM dimming is to be used.

If PWM dimming is to be used first, a target value PWM_lim is defined. PWM_lim describes the lowest dimming level at which PWM dimming is still used.

Scenario (i) above (first dim the system with PWM dimming and add amplitude modulation dimming to increase resolution at low dimming) uses the target relFluxlim. When relFlux_lim=0, there is pure amplitude modulation dimming, an no initial PWM dimming.

Scenario (ii) above (first dim the system with amplitude modulation dimming to avoid flickering and add PWM dimming to avoid a too large AM dimming range) uses the target PWM_lim, when PWM_lim<1. When PWM_lim=1 there is the combined system of scenario (iii) in that PWM dimming is always used.

To get to the desired lighting system color point, each channel should deliver f_ch*Y0_ch lumen, wherein f_ch*Y0_ch=PWM_ch*Yt_ch.

Yt_ch is the amount of flux a channel should give after AM dimming.

In a full AM dimmed system Yt_ch=f_ch*Y0_ch. In a PWM dimmed system Yt_ch=f_ch*Y_ch, /PWM_ch. The non-linear relation Ych(Ich) is used to determine the current so that f_ch*Y0 ch=Ych(Ich).

The method starts in step 90.

In step 92 it is selected if amplitude modulation is to be first used or if PWM dimming is to be first used.

For using amplitude modulation dimming first, the target relFlux_lim and channel fractions are input into step 94.

Step 94 sets a correction value for each channel corr_ch=min(1, fch/relFlux_lim). This correction cannot be greater than 1.

This involves checking if the required lumen per channel is lower than a limit value. If it is lower, a correction is applied. The limit value is a value up to which the color point correction using current is still accurate enough.

Step 96 sets the target channel flux Yt_ch=Y0_ch x fch/corr_ch and sets the PWM value PWM_ch=corr_ch. The correction is the difference between the lowest value allowed and the calculated relative flux f_ch.

Thus the target flux is inversely scaled with corr_ch and the PWM setting is scaled with corr_ch.

In step 98, the required current is then found for the new value Yt_ch. Thus, the PWM and target current values have been found.

For using PWM dimming first, the target PWM_lim and channel fractions are input into step 102. Step 102 sets a correction value for each channel corr_ch=max(1, PWM_lim/f_ch). Thus, the correction cannot be greater than 1.

Step 104 determines if a correction per channel is needed.

This is a decision based on the preference of the designer. The "yes" path provides a correction factor per channel (and the ability in the driver to individually control the current per channel). The "no" path uses only a single correction for all channels which is the same all channels.

If a correction per channel is needed, step 106 sets the target channel flux Yt_ch=Y0_ch/corr_ch and PWM_ch=corr_ch.

Y0_ch is the flux of the channel at nominal current. If a correction is applied to the PWM value (e.g. to make a channel fraction f_ch larger), the flux at 100% PWM needs to be reduced to Yt_ch.

f_ch is the flux fraction per channel. f_ch=flux(It_ch)/flux(Inom_ch)*PWM, where flux(It_ch) is the flux at PWM=1 and target current It, flux(Inom_ch) is the flux of that channel at nominal current.

The target flux is inversely scaled with corr_ch and the PWM setting is scaled with corr_ch.

If a correction per channel is not needed, step 108 sets the target channel flux Yt_ch=Y0_ch/min(corr_ch) and PWM_ch=min(corr_ch).

In this case, all PWMs are scaled in a similar manner, so also the currents will be scaled the same (in first order).

In step 98, the required current is then found for the new value Yt_ch. Thus, the PWM and target current values have been found.

FIG. 8 shows a multi-channel lighting system comprising a plurality of lighting channels 110, the different lighting channels having light sources with different color point. A lighting system controller 112 is part of a lighting driver 114 and controls the drive currents to the different lighting channels using the methods explained above.

The steps of the method (e.g. in FIGS. 5 and 6) have been numbered. However, this does not mean that additional steps may not be present.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method of controlling a lighting system which comprises a plurality of lighting channels with light sources having different color points, comprising:
   a first step of receiving color point information comprising nominal color point information in respect of the light sources;
   a second step of adjusting the color point information in dependence on a currently up to date temperature estimate;
   a third step of further adjusting the color point information in dependence on a currently up to date current drive level for the respective lighting channel, wherein the second and third steps may be performed in either order;
   a fourth step of using the further adjusted color point information to determine a flux contribution of each lighting channel to achieve a desired combined color point and combined light output flux from the plurality of lighting channels;

a fifth step of updating the current drive levels for the plurality of lighting channels to create updated current drive levels to achieve the flux contribution of each lighting channel;

a sixth step of updating the temperature estimate to create an updated temperature estimate based on the updated current drive levels; and repeating the second to sixth steps until (i) the temperature estimate converges to a value which deviates, when being updated, by less than a threshold, and/or (ii) the current drive levels converge to values which deviate, when being updated, by less than a threshold.

2. The method of claim 1, comprising repeating the second to sixth steps until (i) the temperature estimate converges to a value which deviates, when being updated, by less than a threshold, and (ii) the current drive levels converge to values which deviate, when being updated, by less than a threshold.

3. The method of claim 1, wherein the second step comprises transforming CIE 1936 XYZ color coordinates to CIE xyY chromaticity color coordinates, applying temperature corrections on dx/dT and dy/dT and flux, and transforming back to XYZ color coordinates.

4. The method of claim 1, wherein the third step comprises using information relating to the rate of change of CIE xy chromaticity color coordinates with respect to drive current.

5. The method of claim 1, wherein the third step comprises:

a first sub-step of deriving a representative wavelength for the adjusted color point information;

a second sub-step of adjusting the representative wavelength in dependence on a currently up to date current drive level for the respective lighting channel; and a third sub-step of further adjusting the color point information based on the adjusted representative wavelength.

6. The method of claim 5, wherein the first sub-step uses a model for converting from the adjusted color point information to the representative wavelength.

7. The method of claim 6, wherein the second sub-step uses a model of the current dependency of different wavelengths and determines a color point shift with wavelength based on a model of the CIE x,y color coordinates as a function of a dominant wavelength.

8. The method of claim 5, wherein the third sub-step uses a model for converting from the adjusted representative wavelength to the color point information.

9. The method of claim 1, further comprising applying pulse width modulation to the drive currents for the lighting channels.

10. A method of controlling the lighting system which comprises a plurality of lighting channels with light sources having different color points, comprising:

for a first range of dimming levels, applying the method of claim 1; and for a second range of dimming levels, applying pulse width modulation dimming.

11. The method of claim 10, wherein:

the first range is for low brightness levels and the second range is for high brightness levels; or the first range is for high brightness levels and the second range is for low brightness levels.

12. A non-transitory computer program comprising computer program code which is adapted, when said program is run on a computer, to implement the method of claim 1.

13. A processor for controlling the lighting system which comprises a plurality of lighting channels with light sources having different color points, wherein the processor is programmed to execute the computer program of claim 12.

14. A lighting controller comprising a processor as claimed in claim 13.

15. A multi-channel lighting system comprising:

the plurality of lighting channels, the different lighting channels having light sources with different color point; and the lighting system controller as claimed in claim 14 for controlling the drive currents to the different lighting channels.

* * * * *